US006760990B2

(12) United States Patent
Lowndes

(10) Patent No.: US 6,760,990 B2
(45) Date of Patent: Jul. 13, 2004

(54) MOUNTING OF FLEXIBLE DISPLAY PANELS

(75) Inventor: James George Lowndes, Otterey (ZA)

(73) Assignee: Omnigraphics Capital (Proprietary) Limited, Pretoria (ZA)

( * ) Notice: Subject to any disclaimer, the term of this patent is extended or adjusted under 35 U.S.C. 154(b) by 0 days.

(21) Appl. No.: 09/768,010

(22) Filed: Jan. 24, 2001

(65) Prior Publication Data

US 2002/0029504 A1 Mar. 14, 2002

Related U.S. Application Data

(63) Continuation of application No. PCT/ZA98/00033, filed on May 17, 1999, now abandoned.

(30) Foreign Application Priority Data

Jul. 24, 1998 (ZA) ............................................. 98/6605

(51) Int. Cl.[7] .......................... G06F 15/00; G06F 21/04
(52) U.S. Cl. ............................ 40/603; 40/590; 160/327
(58) Field of Search .......................... 40/603, 604, 590, 40/588; 160/327, 328, 371, 391, 395

(56) References Cited

U.S. PATENT DOCUMENTS

| | | | | | |
|---|---|---|---|---|---|
| 1,457,255 | A | * | 5/1923 | Loveless | |
| 3,024,068 | A | * | 3/1962 | Eames | |
| 3,805,873 | A | * | 4/1974 | Bloomfield | 160/392 |
| 4,757,854 | A | * | 7/1988 | Rippberger | 160/378 |
| 5,046,545 | A | | 9/1991 | Loomis et al. | 160/368.1 |
| 5,239,765 | A | | 8/1993 | Opdahl | 40/603 |
| 5,555,659 | A | | 9/1996 | Hade | 40/604 |
| 5,893,227 | A | | 4/1999 | Johansson et al. | 40/603 |
| 6,053,558 | A | * | 4/2000 | Weldy et al. | 160/374.1 |
| 6,234,561 | B1 | * | 5/2001 | Huotari | 296/100.15 |
| 6,250,002 | B1 | * | 6/2001 | Wittenberg | 160/378 |
| 6,276,082 | B1 | * | 8/2001 | Richards et al. | 160/327 |
| 6,305,111 | B1 | * | 10/2001 | Opdahl | 40/590 |
| 6,322,129 | B2 | * | 11/2001 | Huotari | 296/100.15 |
| 2001/0020792 | A1 | * | 9/2001 | Huotari | 296/100.16 |
| 2001/0054244 | A1 | * | 12/2001 | Richards et al. | 40/603 |
| 2002/0096268 | A1 | * | 7/2002 | Schmeichel et al. | 160/328 |

FOREIGN PATENT DOCUMENTS

| | | |
|---|---|---|
| DE | 2447185 | 4/1976 |
| GB | 2302436 | 1/1997 |
| WO | WO9312514 | 6/1993 |

* cited by examiner

*Primary Examiner*—D. Glenn Dayoan
*Assistant Examiner*—Patricia Engle
(74) *Attorney, Agent, or Firm*—Connolly Bove Lodge & Hutz LLP; Larry J. Hume

(57) ABSTRACT

A display panel (10) is mounted on an underlying surface (TSW) using three extrusions (20.1, 36.1, and 20.3). The extrusions (20.1, 36.1) are secured to the underlying surface in parallel but spaced positions. The panel (10) has stiffening elements (18) in pockets (16) along its edges. The elements and pockets are inserted into a recess (26) of the upper extrusion (20.1) and into a recess (26) of the lower extrusion (20.3). With the extrusion (20.3) lying along the line (L) its end (34) is inserted in the recess (44) of the extrusion (36.1). The extrusion (20.3) is then swung in an arc (arrow A) against the surface (TSW) to tension the panel (10). The extrusion (20.3) is then fixed to the surface (TSW).

4 Claims, 3 Drawing Sheets

MOUNTING OF FLEXIBLE DISPLAY PANELS

RELATED APPLICATIONS SECTION

This is a continuation of, and claims priority under 35 USC 119 (a)–(d) to, International Patent Application Ser. No. PCT/-ZA98/00033 with an international filing date of May 17, 1999, published in English under PCT Article 21(2) and now abandoned. This application also claims priority under 35 USC 119(a)–(d) to South African Patent Application Ser. No. ZA98/6605, which was filed Jul. 24, 1998 and to which the above PCT Application claims priority.

FIELD OF THE INVENTION

THIS INVENTION relates to the mounting of flexible display panels.

BACKGROUND TO THE INVENTION

The use of flexible display panels constituted by printed plastics sheeting, usually printed polyvinyl sheeting, has become widespread for advertising purposes. Such sheets are usually adhered to an underlying surface, such as the side, front or back surface of a truck. Securing the sheet to the truck is time consuming and requires a degree of skill to prevent the formation of trapped air bubbles and to ensure that the sheet is accurately positioned.

BRIEF DESCRIPTION OF THE INVENTION

According to one aspect of the present invention there is provided a method of mounting a flexible display panel which comprises providing an elongate stiffening element along each of two opposed edges of the display panel, inserting one edge and its stiffening element into an elongate recess in a first mounting element which is secured to an underlying surface, inserting the other panel edge and other stiffening element into an elongate recess of a second mounting element, and securing said second mounting element to said surface parallel to said first mounting element and with said recesses facing away from one another.

To tension the panel the method can include the step of securing a third elongate mounting element to said underlying surface parallel to and spaced from said first element, the third mounting element having an elongate recess, said recesses in the first and third elements facing away from one another, inserting an edge of said second mounting element in said recess of the third mounting element, and swinging the second mounting element in an arcuate movement using the elongate contact zone between said edge and the recess in the third element as a fulcrum thereby to bring said second mounting element against said surface and tension the panel, and securing said second mounting element to said underlying surface.

The other two edges of the panel can be free, that is, not attached to said surface. Said one and other edges of the panel can be the top and bottom edges or the horizontally spaced side edges. In a further form all four edges of the panel are secured to said underlying surface using two of said first mounting elements, two of said second mounting elements and two of said third mounting elements.

Said elements can be riveted, preferably pop-riveted, to said surface. In an alternative form said second element can be secured by releasable latches to said underlying surface.

According to a further aspect of the present invention there is provided a mounting structure including a first elongate mounting element secured to an underlying surface, said element defining an elongate recess, a second elongate mounting element secured to said surface at a position spaced from said first element, said second element defining an elongate recess, the recesses facing away from one another, and a flexible display panel having a stiffening element along each of two opposed edges thereof, there being an edge and a stiffening element in each of said recesses.

In a specific constructional form there is a third elongate element secured to said surface and spaced from said first elongate element, said third element defining an elongate recess, the recesses in the first and third elements facing away from one another, said second element having an edge which is in the recess of the third element.

According to another aspect of the present invention there is provided a method of mounting a flexible display panel which comprises releasably attaching one edge of the panel to a first elongate mounting element which is fixed to an underlying surface, releasably attaching an opposed edge of the panel to a second elongate mounting element, and pivoting said second element in an arc about a fixed axis extending in the direction of elongation of said elements in such manner as to displace said opposed edge of the panel away from said one edge thereby to tension the panel, and securing said second element to said underlying surface.

BRIEF DESCRIPTION OF THE DRAWINGS

For a better understanding of the present invention, and to show how the same may be carried into effect, reference will now be made, by way of example, to the accompanying drawings in which.

DETAILED DESCRIPTION OF THE DRAWINGS

Figure 1:
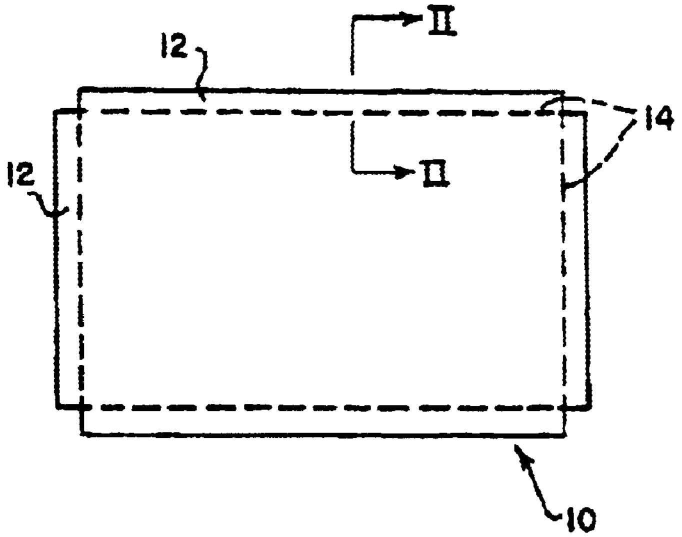
FIG. 1 is an elevation of a flexible display panel.

The display panel 10 shown in FIG. 1 is in the form of an initially rectangular sheet of printed synthetic plastics material. The preferred material is polyvinylchloride (PVC).

Figure 2:
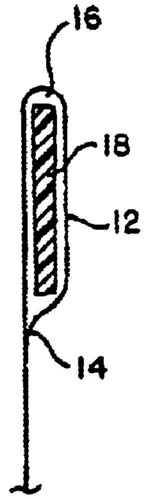
FIG. 2 is a section, to an enlarged scale, on the line II—II of FIG. 1.

Rectangular pieces are removed from the corners of the rectangular sheet by cutting them away. Four edge zones 12 (see particularly FIG. 2) of the sheet are then folded over and welded at 14 to the remainder of the sheet to form four pockets 16 which are all open at both ends.

Lengths of plastic extrusion 18 are slid into the pockets 16, there being one length of plastic extrusion in each pocket and each length extending from one end of the respective pocket to the other.

Figure 3:
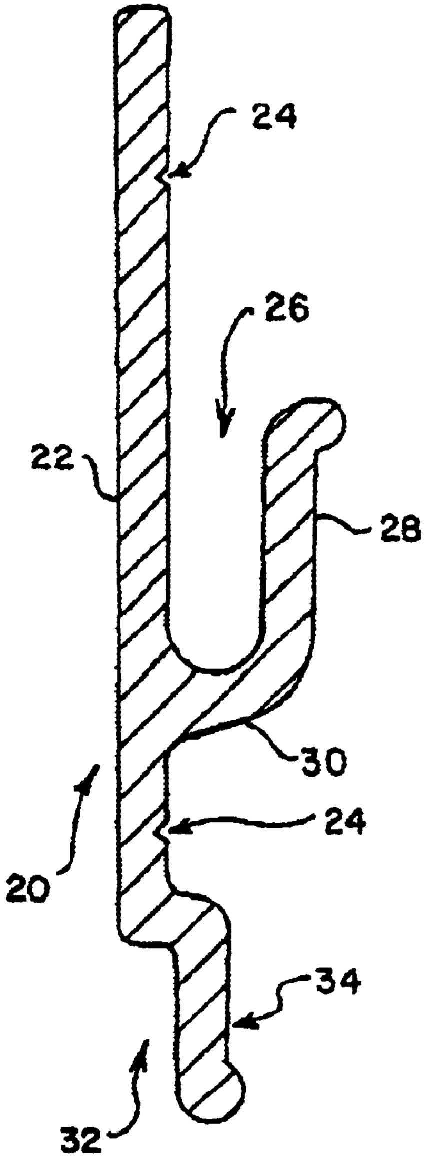
FIG. 3 is a section through a first aluminium extrusion.

The extrusion 20 shown in FIG. 3 comprises a base plate 22 having two vee grooves 24 in the front face thereof. The vee grooves 24 provide zones through which the extrusion 20 can be pop-riveted to an underlying surface.

An upwardly open recess 26 is provided between a central part of the base plate 22 and a front wall 28 which is joined to the base plate 22 by a generally horizontal wall 30. A further recess 32, which is downwardly open, is provided by a cranked lower part 34 of the base plate 22. The recess 32 is behind the cranked lower part 34 of the base plate 22.

The edges of the extrusion are rounded to eliminate any hazardous regions. The wall 28 and part 34 are formed with bulbous ends which eliminate any sharp edges which could abrade and cut through the display panel 10.

Figure 4:
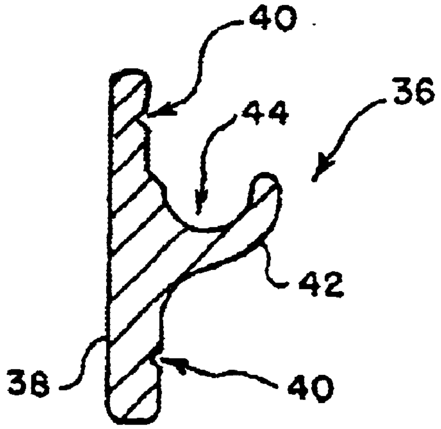
FIG. 4 is a section through a further aluminium extrusion.

The aluminium extrusion 36 of FIG. 4 also comprises a base plate 38 with two vee grooves 40 in the front face thereof. A hook 42, which defines an upwardly open recess 44 of semi-circular cross sectional shape, protrudes from the front face of the base plate 38.

Figure 5:
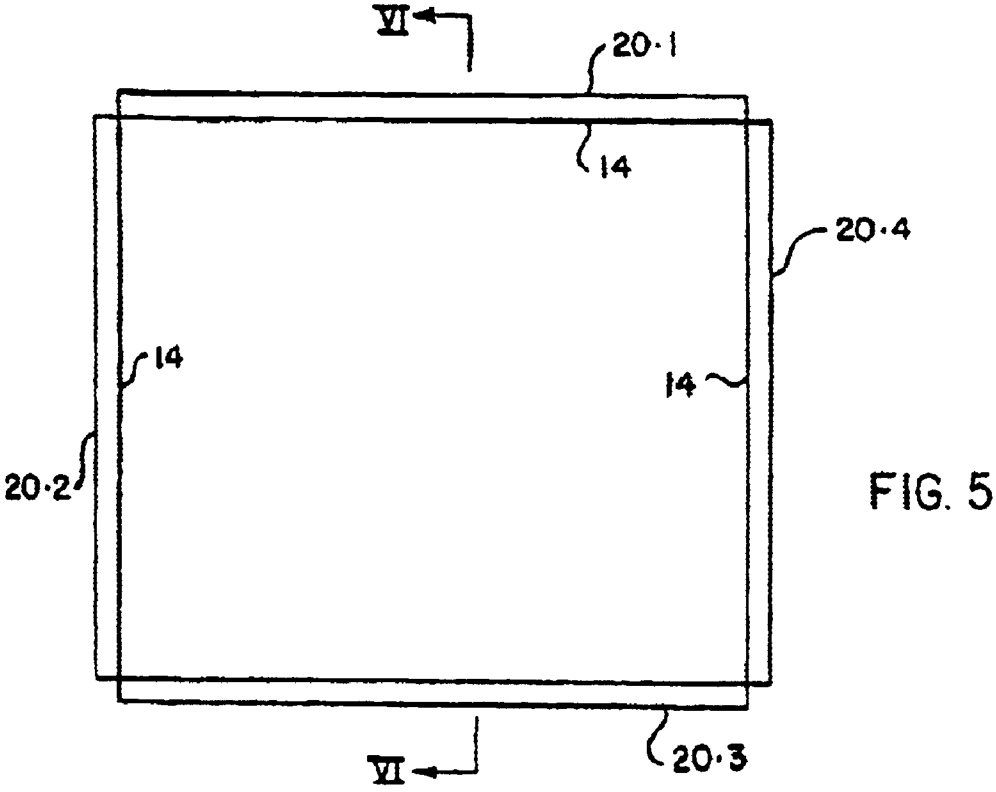
FIG. 5 is an elevation, to a larger scale than FIG. 1, of a mounted display panel.
Figure 6:
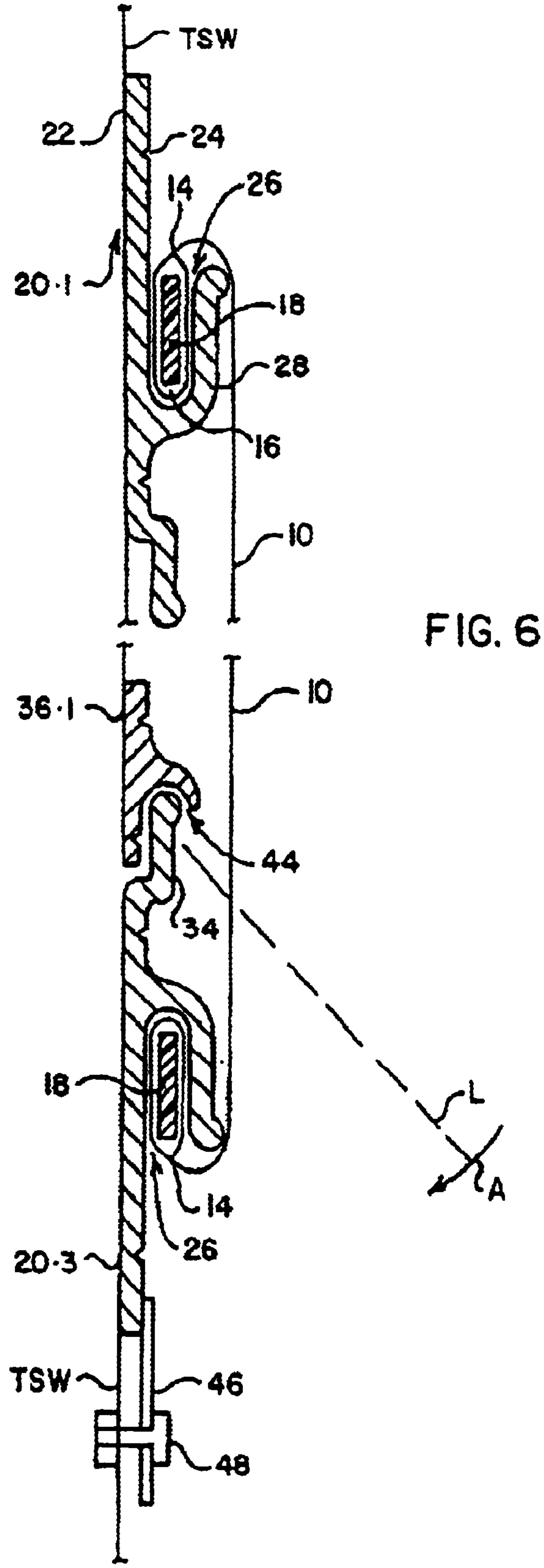
FIG. 6 is a section, to an enlarged scale, on the line VI—VI of FIG. 5.

Turning now to FIGS. 5 and 6, which are not drawn to the same scale, it will be assumed for the purposes of this description that the underlying surface on which the display panel 10 is to be mounted is the side wall of a truck body. This wall is designated TSW in FIG. 6. Two lengths of the extrusion 20 are secured to the truck side wall. The first of these extrusions, designated 20.1 in FIGS. 5 and 6, extends horizontally along the top edge of the side wall. The other of these extrusions, designated 20.2, extends vertically adjacent the end of the side wall which is immediately to the rear of the cab, that is, adjacent the front or leading edge of the side wall. The recess 26 of the extrusion 20.1 is upwardly open, that is, it is positioned as shown in FIG. 3, and the recess 26 of the extrusion 20.2 is forwardly open, that is, to the left in FIG. 5.

Two lengths of the extrusion 36 are secured to the truck side wall. One, designated 36.1 in FIG. 6, is positioned along the lower edge of the side wall, and the other is positioned vertically at the trailing end of the side wall. The recess 44 of the horizontal extrusion 36.1 is open downwardly as shown in FIG. 6 and the recess 44 of the vertical extrusion 36 is open to the right as viewed in FIG. 5.

The display panel is mounted by pressing the upper pocket 16 and upper extrusion 18 into the upwardly open recess 26 of the extrusion 20.1 (see FIG. 6). The panel 10 extends around the upper edge of the wall 28 and then downwardly as shown in this Figure. The panel 10 conceals all but the upper part of the base plate 22. Likewise, the left hand pocket 16 and extrusion 18, as viewed in FIG. 5, are inserted from the left into the recess 26. The panel 10 extends around the free left hand edge of the wall 28 and then to the right towards the rear of the truck.

The lower pocket 16 and extrusion 18 are inserted, from below, into the recess 26 of an inverted length of the extrusion 20 which length of extrusion has been designated 20.3 in FIGS. 5 and 6. The extrusion 20.3 is not, at this time, attached to the side wall of the truck. The position of the extrusion 20.3 is such that the free edge of the cranked part 34 of the extrusion 20.3 is uppermost. The cranked part 34 is inserted from below into the downwardly open recess 44. The extrusion 20.3 at this stage lies along the line L in FIG. 6. The extrusion 20.3 is then swung downwardly, as shown by arrow A, in an arc using the contact line between the surface of the recess 44 and the part 34 as fulcrum.

Once the base plate 22 is vertical and against the side wall of the truck, it is pop-riveted to the truck through the lower vee groove 24. Movement of the extrusion 20.3 in the way described tensions the display panel 10 by displacing its lower edge downwards eliminating wrinkles.

The fourth side of the panel 10, that is, what becomes its trailing edge, is secured to the vertical extrusion 36 in the same way using a further extrusion 20.4.

The extrusions 20.3 and 20.4 can, if desired, be secured in place by means of two rows of latches extending one along the lower edge of the side wall and the other along the rear or trailing edge of the side wall. Each latch can include a latch element mounted on a centre pivot. One such latch is diagrammatically shown at 46 in FIG. 6 and its pivot is shown at 48.

Where circumstances permit, the panel 10 can be secured along two opposed edges e.g. the top and bottom edges or the two vertical edges, instead of along all four edges as in the described embodiment.

What is claimed is:

1. A method of mounting a flexible display panel which comprises:

providing an elongated stiffening element along each of two opposed edges of the flexible display panel;

securing to an underlying surface a first elongated mounting element having an elongated recess extending along it, said elongated recess having an elongated mouth bounded by surfaces of said first elongated mounting element, the width of the elongated mouth relative to the dimensions of the elongated stiffening element being such as to permit either of the elongated stiffening elements to be inserted into said elongated recess through the corresponding elongated mouth and removed through the elongated mouth;

securing a second elongate mounting element having an elongate recess therein to said underlying surface parallel to and spaced from said first elongated mounting element, said elongated recesses in said first and second elongated mounting elements facing away from one another;

providing a third elongate mounting element having an elongate mouth bounded by surfaces of said third elongated mounting element, the width of said elongated mouth of the third elongated mounting element relative to the dimensions of the elongated stiffening element being such as to permit either of the elongated stiffening elements to be inserted into the elongated recess of the third elongated mounting element through the corresponding elongated mouth and removed through the corresponding elongated mouth;

inserting one of the two opposing edges of said flexible display panel into said elongated recess of the first elongated mounting element through the corresponding elongated mouth of the elongated recess in said first elongated mounting element;

inserting the other opposing edge of said flexible display panel into said elongated recess of said third elongated mounting element through the corresponding elongated mouth of the elongated recess in said third elongated mounting element;

inserting an edge of said third elongated mounting element into said elongated recess of said second elongated mounting element, and swinging the third elongated mounting element in an arcuate movement using an elongate contact zone between the edge of the third elongated mounting element and said elongated recess in said second elongated mounting element as a fulcrum thereby to bring said third elongated mounting element against said underlying surface and tension the panel, and securing said third elongated mounting element to said underlying surface.

2. In combination, a display panel having an elongated stiffening element along each of two opposing edges of the flexible display panel and mounting means for the flexible display panel, the mounting means comprising;

a first mounting element having an elongated recess in it, said elongated recess having an elongated mouth bounded by surfaces of said first mounting element, the width of said elongated mouth relative to the dimensions of the elongated stiffening elements being such as to permit either of the elongated stiffening elements to be inserted into said elongated recess through the corresponding elongated mouth and removed through the corresponding elongated mouth, said first mounting element being secured to an underlying surface and one of said elongated stiffening elements being in said elongated recess;

a second mounting element having an elongated recess therein, said second mounting element being secured to said underlying surface parallel to and spaced from said first mounting element, said elongated recesses in said first and second mounting elements facing away from one another;

a third mounting element having an elongated recess in it, said elongated recess having an elongated mouth bounded by surfaces of the third mounting element, the width of said elongated mouth relative to the dimensions of the elongated stiffening elements being such as to permit either of the elongated stiffening elements to be inserted into said elongated recess in said third mounting element through the corresponding elongated mouth and removed through the corresponding elongated mouth, said third mounting element having an edge in said elongated recess of said second mounting element and being secured to said underlying surface, said elongated recess in said third mounting element facing away from said elongated recess in said first mounting element and the other of said elongated stiffening elements being in said elongated recess of said third mounting element.

3. The combination of claim 2, wherein each of the elongated stiffening elements is of rectangular section, the thickness of each of the elongated stiffening element being less than that dimension thereof which is at right angles to its thickness dimension, each of the elongated stiffening element having two parallel side faces and two parallel edges at right angles to the parallel side faces.

4. The combination of claim 3, wherein said elongated recesses in said first and third mounting elements each have side faces which are parallel to one another and generally parallel to said parallel side faces of each of the elongated stiffening elements.

* * * * *

UNITED STATES PATENT AND TRADEMARK OFFICE

CERTIFICATE OF CORRECTION

PATENT NO. : 6,760,990 B2 
DATED : July 13, 2004
INVENTOR(S) : James G. Lowndes

It is certified that error appears in the above-identified patent and that said Letters Patent is hereby corrected as shown below:

Column 1,
Lines 6-13, the section paragraph after the heading entitled, “RELATED APPLICATION SECTION”, should be corrected to read as follows:

-- This application is a continuation under 35 U.S.C. § 120 of International Patent Application Serial No. PCT/ZA98/00033 with an international filing date of May 17, 1999, published in English under PCT Article 21(2) and now abandoned. Internationl Patent Application Serial No. PCT/ZA98/00033 claims priority under 35 U.S.C. § 119(a)-(d) to South African Patent Application Serial No. ZA98/6605 which was filed on July 24, 1998. --

Signed and Sealed this

Seventh Day of June, 2005

JON W. DUDAS
*Director of the United States Patent and Trademark Office*